(12) United States Patent
Shahinpoor

(10) Patent No.: US 6,612,739 B2
(45) Date of Patent: Sep. 2, 2003

(54) SHAPE MEMORY ALLOY TEMPERATURE SENSOR

(76) Inventor: Mohsen Shahinpoor, 9910 Tanoan Dr., NE., Albuquerque, NM (US) 87111

( * ) Notice: Subject to any disclaimer, the term of this patent is extended or adjusted under 35 U.S.C. 154(b) by 0 days.

(21) Appl. No.: 10/005,403

(22) Filed: Dec. 5, 2001

(65) Prior Publication Data

US 2003/0103553 A1 Jun. 5, 2003

(51) Int. Cl.[7] .............................. G01K 5/48; G01K 5/70
(52) U.S. Cl. .................. 374/205; 374/187; 374/159; 374/186; 374/194
(58) Field of Search .............................. 374/159, 187, 374/205, 162, 102, 186, 194; 546/367; 116/216, 221

(56) References Cited

U.S. PATENT DOCUMENTS

| | | |
|---|---|---|
| 3,695,903 A | 10/1972 | Telkes et al. |
| 3,696,679 A | 10/1972 | Peterson et al. |
| 4,028,944 A | 6/1977 | Erb |
| 4,148,272 A | 4/1979 | Wetzold |
| 4,448,147 A * | 5/1984 | Dewaegheneire ............ 116/216 |
| 4,931,420 A | 6/1990 | Asano et al. |
| 5,034,233 A | 7/1991 | McCloy, Jr. |
| 5,282,684 A | 2/1994 | Holzer |
| 5,301,632 A | 4/1994 | Cayol et al. |
| 5,335,994 A * | 8/1994 | Weynant nee Girones .. 374/205 |
| 5,366,292 A * | 11/1994 | Voss ............................ 374/188 |
| 5,531,180 A * | 7/1996 | Bianchini .................... 116/216 |
| 5,735,607 A | 4/1998 | Shahinpoor |
| 5,764,143 A | 6/1998 | Buccola |
| 5,789,100 A * | 8/1998 | Burroughs et al. ............ 429/90 |
| 6,242,714 B1 | 6/2001 | Narumiya et al. |
| 6,422,171 B1 * | 7/2002 | Betts ............................ 116/221 |
| 6,425,343 B1 * | 7/2002 | Akers et al. ................. 116/216 |

FOREIGN PATENT DOCUMENTS

| | | | | |
|---|---|---|---|---|
| JP | 61189426 A | * | 8/1986 | ........... G01K/11/00 |
| JP | 63241325 A | * | 10/1988 | ........... G01K/11/00 |
| JP | 02134523 A | * | 5/1990 | ........... G01K/11/00 |
| JP | 03135742 A | * | 6/1991 | ........... G01K/11/00 |
| JP | 10019685 A | * | 1/1998 | ............ G01K/5/60 |
| JP | 10062267 A | * | 3/1998 | ........... G01K/11/00 |
| WO | WO 09214128 | * | 8/1992 | ........... G01K/11/06 |

OTHER PUBLICATIONS

Design and Modeling of a Novel Fibrous SMA Actuator; Proc. SPIE Smart Materials and Structures Conference, vol. 2190, pp. 730–738 (1994).

"A Phenomenological Description of Thermodynamical Behavior of Shape Memory Alloys," Transactions of the ASME, J. Appl. Mech., vol. 112, pp. 158–163 (1990).

* cited by examiner

*Primary Examiner*—Diego Gutierrez
*Assistant Examiner*—Lydia M. DeJesús
(74) *Attorney, Agent, or Firm*—V. Gerald Grafe

(57) ABSTRACT

The present invention comprises a sensing element mounted with a body. The sensing element comprises a portion made with a shape memory alloy. The sensing element mounts with the body, fixedly at two ends. The fixed mounting at one end, however, is configured so that it can be converted to allow a moveable relationship between the body and the sensing element. While the mounting is fixed, the sensing element is prevented from indicating temperature deviations, and the apparatus can be stored and handled freely. After the mounting is converted to provide a moveable relationship, however, a temporary temperature excursion can cause the SMA portion to contract, providing a discernible change in the relationship between the sensing element and the body.

18 Claims, 5 Drawing Sheets

SHAPE MEMORY ALLOY TEMPERATURE SENSOR

BACKGROUND OF THE INVENTION

This invention relates to temperature sensors, specifically shape memory alloy temperature sensors that provide persistent indication once their temperature reaches a critical value.

Exposure to temperatures above a critical temperature can damage many important materials. Food products such as frozen dairy products and frozen meats can spoil when exposed to thawing temperatures for even a short time. Frozen medical products such as blood and certain pharmaceuticals can be unsafe once exposed to thawing or other high temperatures, even if the temperature later returns to a safe value. Low temperatures can also compromise important properties of some rubber and rubber-like materials. The damage is often unseen, and can persist even if the temperature returns to an acceptable level. This situation can arise in transportation, where a frozen product temporarily experiences high temperatures due to improper handling or cooling equipment malfunction.

Many conventional temperature sensors do not provide a persistent record of temporary temperature deviations. Conventional temperature sensors, such as common thermometers, indicate the current temperature only. They provide a continuous indication of the current temperature of the material. They do not provide a permanent indication of out-of-range temperatures without additional permanent recording apparatus. Accordingly, there is a need for sensors that provide a persistent record of temporary out-of-range temperatures.

Shape memory alloys (SMAs) have properties that might be useful in developing the needed sensors. An SMA has a certain shape, its Austenitic state, at temperatures below the SMA's Austenitic temperature $A_f$. The SMA moves in a certain fashion to a second shape, its Martensitic state, when the temperature rises above the Austenitic temperature $A_f$. The SMA will not return to the Austenitic shape without additional external force even if the temperature subsequently falls below the Austenitic temperature $A_f$. SMAs are used in a variety of applications, such as those described in "Design and Modeling of a Novel Fibrous SMA Actuator," Proc. SPIE Smart Materials and Structures Conference, vol. 2190, pp. 730–738 (1994), and "A Phenomenological Description of Thermodynamical Behavior of Shape Memory Alloys," Transactions of the ASME, J. Appl. Mech., vol. 112, pp. 158–163 (1990). SMAs have been suggested for use in persistent temperature indicators. See Shahinpoor, U.S. Pat. No. 5,735,607, incorporated herein by reference. The sensors suggested by the U.S Pat. No. 5,735,607 however, can require that the apparatus be kept below the threshold temperature during assembly and storage. This requirement can complicate manufacture and handling. There is a need for temperature indicators that can be manufactured, stored, and handled at arbitrary temperatures, then enabled to provide a persistent record of temporary temperature deviations.

SUMMARY OF THE INVENTION

The present invention comprises a sensing element mounted with a body. The sensing element comprises a portion made with a shape memory alloy. The sensing element mounts with the body, fixedly at two ends. The fixed mounting at one end, however, is configured so that it can be converted to allow a moveable relationship between the body and the sensing element. While the mounting is fixed, the sensing element is prevented from indicating temperature deviations, and the apparatus can be stored and handled freely. After the mounting is converted to provide a moveable relationship, however, temporary excursion can cause the SMA portion to contract, providing a discernible change in the relationship between the sensing element and the body.

The SMA portion can be a wire made with a SMA, of length equal to the distance between the two mounting portions in one state, and less than the distance in the other state. The wire can be passed through an opening such as a notch or hole in the body, and a bend or a thickened portion used to prevent the wire from moving back through the opening. After the apparatus is in place, and the temperature reduced below the critical temperature, then the bend or thickened portion can be removed. Subsequent temperature increases can initiate a shortening of the SMA wire; the difference in length relative to the body can provide an indication of an over-temperature condition. Even if the temperature excursion was only transitory, the SMA wire will not appreciably lengthen once shortened, absent application of external force. Discernment of the condition of the apparatus can be facilitated by highlighting the relationship between the sensing element and the body. As examples, colored regions and witness marks can be used to make changes in the length or shape of the SMA portion readily apparent.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention comprises a sensing element mounted with a body. The sensing element comprises a portion made with a shape memory alloy. The sensing element mounts with the body, fixedly at two ends. The fixed mounting at one end, however, is configured so that it can be converted to allow a moveable relationship between the body and the sensing element. While the mounting is fixed, the sensing element is prevented from indicating temperature deviations, and the apparatus can be stored and handled freely. After the mounting is converted to provide a moveable relationship, however, a temperature excursion can cause the SMA portion to contract, providing a discernible change in the relationship between the sensing element and the body.

EXAMPLE EMBODIMENT

Figure 1A:
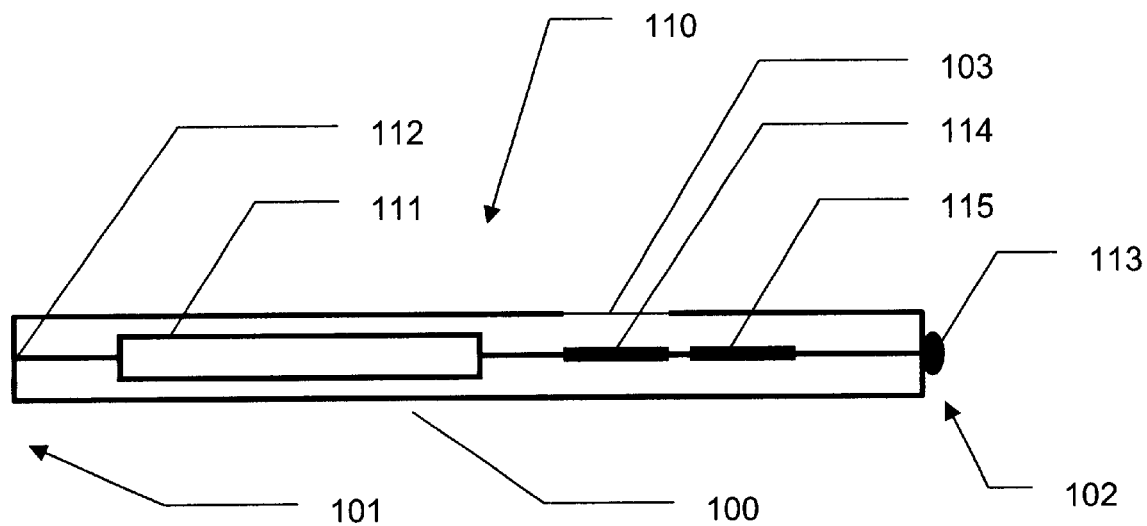
FIG. 1(a,b,c) is an illustration of an apparatus according to the present invention.
Figure 1B:
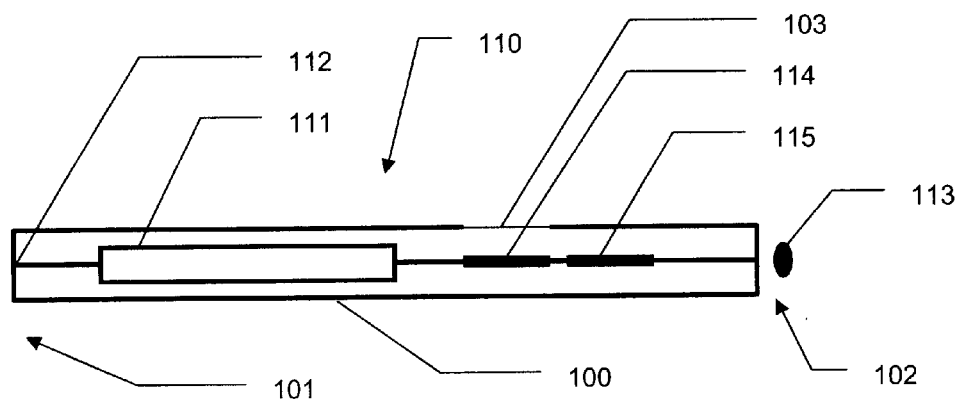
Figure 1C:
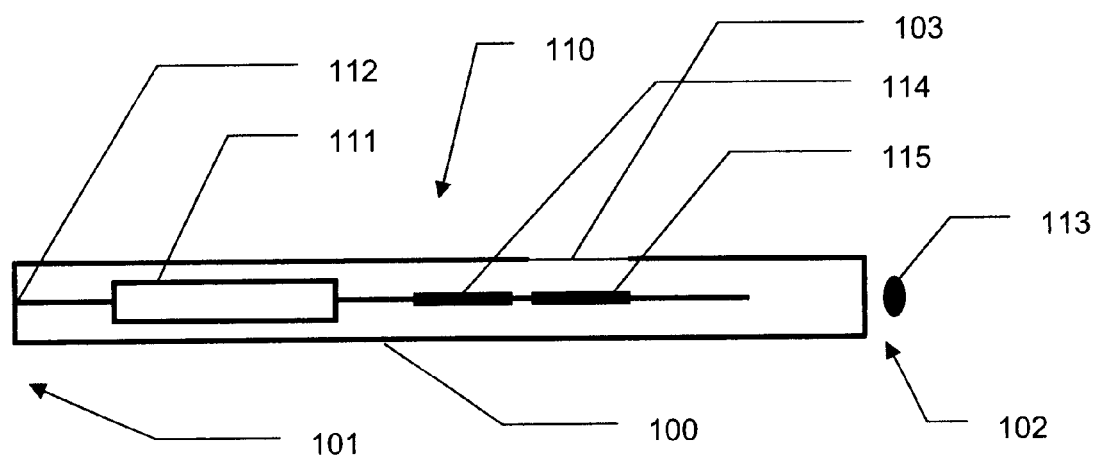

FIG. 1a is a sectional view of an embodiment of the present invention. A sensing element 110 mounts with a body 100. A first end 112 of the sensing element 110 mounts fixedly with an attachment portion 101 of the body 100. The sensing element comprises a SMA portion 111. The sensing element further comprises a removable engagement portion 113 that engages a holding portion 102 of the body 100. The engagement portion 113 prevents changes in length of the sensing element 100 relative to the body 100. Conversion of the fixed relationship between the engagement portion 113 and the holding portion 102, for example by cutting the engagement portion 113 from the sensing element 110, allows the sensing element 110 to contract. Exposure to temperature above the critical temperature of the SMA portion 111 can cause the SMA portion 111 to contract (once the restraint of the engagement portion is removed), moving, for example, an indicating portion 114 relative to an indicator surface 103. That movement can be perceived, for example by using different colors for the indicating portion 114 and the indicator surface 103, allowing ready determination of whether the apparatus has been exposed to excessive temperatures.

Once the SMA portion contracts, it does not return to its original length without the application of force. Consequently, the indication of an over-temperature conditions persists, even if the temperature subsequently returns to below the critical temperature. The engagement portion allows the apparatus to be manufactured, stored, and handled at temperatures in excess of the critical temperature, since the engagement portion prevents contraction of the SMA portion. The apparatus can be installed in the temperature-critical environment, and the temperature reduced to below the critical temperature, before changing the fixed engagement. Subsequent temperature changes will provide the desired persistent indication of exposure to elevated temperature.

The SMA portion can be a wire made with a SMA, of length equal to the distance between the two mounting portions in one state, and less than the distance in the other state. The wire can be passed through an opening such as a notch or hole in the body, and a bend or a thickened portion used to prevent the wire from moving back through the opening. After the apparatus is in place, and the temperature reduced below the critical temperature, then the bend or thickened portion can be removed. Subsequent temperature increases can initiate a shortening of the SMA wire; the difference in length relative to the body can provide an indication of an over-temperature condition. Even if the temperature excursion was only transitory, the SMA wire will not return to its original length once shortened, absent application of external force. Discernment of the condition of the apparatus can be facilitated by highlighting the relationship between the sensing element and the body. As examples, colored regions and witness marks can be used to make changes in the length or shape of the SMA portion readily apparent.

EXAMPLE EMBODIMENT

Figure 2:
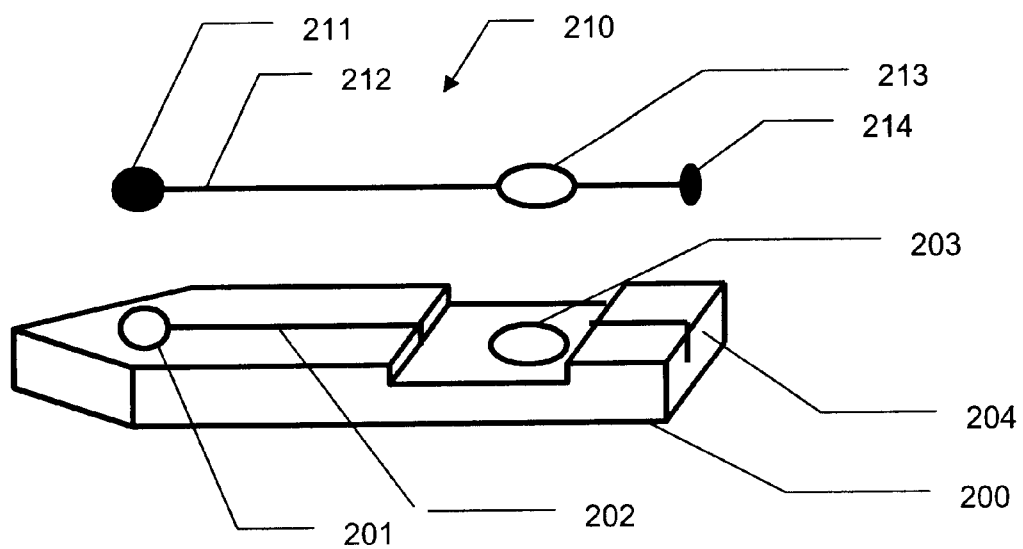
FIG. 2 is an illustration of an apparatus according to the present invention.

FIG. 2 is a schematic view of an embodiment of the present invention. A body 200 defines a channel having an end 201, a groove 202, an indicator region 203, and terminating with the end of the body 204. A sensing element 210 comprises a first end 211 shaped to fit in the end 201 of the channel, a length of SMA wire 212 sized to fit in the groove 202, an indicator 213 (e.g., green), and an indicator 213 (e.g., red), and a second end 214, or engagement knob, sized to be too large to fit into the groove at the end of the body 204. The length of wire 212 is, in its expanded or Austenitic state, approximately as long as the groove 202, and, in its contracted or Martensitic state, shorter than the groove 202.

The sensing element can be installed into the body at a temperature above the Austenitic finish temperature $A_f$, even though the length in the Martensitic state is less than the length of the groove. In the Martensitic state, the sensing element (SMA wire) is in a superelastic state. An end of the element can be pressed the end of the channel. The SMA wire can be stretched and the engagement knob placed beyond the end of the groove. Once the apparatus is in the desired temperature environment (e.g., frozen below the Austenitic finish temperature $A_f$), the sensing element can be altered, for example by cutting off the second end or the engagement knob. If the critical temperature is reached, then the SMA wire will contract and move the red indicator in front of the display window. The indicator's changed position can be highlighted with, for example, contrasting colors and windows in the body. Indicators having area of greater than 50 mm$^2$ can be suitable for some applications. The body in the figure is shown with one end of narrow cross-section to facilitate insertion in items whose temperature is to be monitored, for example into foodstuffs such as meat. The indicator in the figure is shown as a flat element; it could comprise a colored portion of the wire; or witness marks on the wire, the body, or both; or a differently shaped portion of the wire such as a flattened portion thereof.

EXAMPLE EMBODIMENT

Figure 3A:
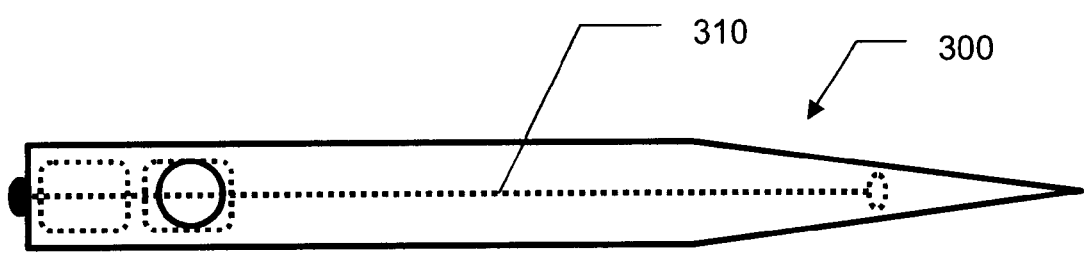
FIG. 3(a,b) is an illustration of an apparatus according to the present invention.
Figure 3B:
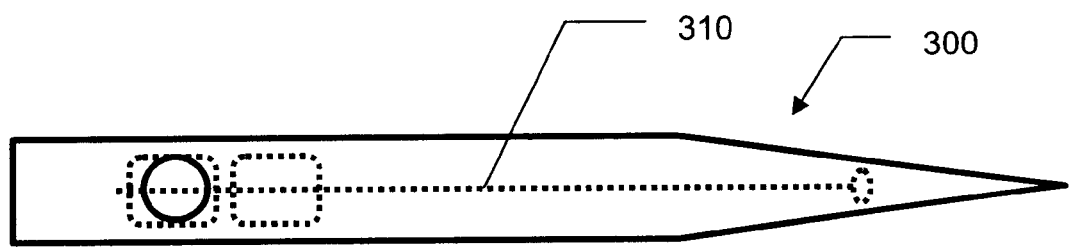

FIG. 3(a,b) is an illustration of an embodiment of the present invention. A wire or ribbon is made of a shape memory alloy 310. The wire or ribbon 310 mounts with a body 300, extending from a first portion of the body to a second portion of the body. A first end of the wire or ribbon mounts with the first portion of the body such that movement of the wire or ribbon toward the second portion of the body is constrained, for example by pinning the wire or ribbon to the body. A second end of the wire or ribbon has a thickened section attached. The wire or ribbon passes through a portion of the body that allows passage of the wire or ribbon, but does not allow passage of the thickened section. Two indicators mount with the wire or ribbon. The body has a first end shaped as a point to allow easy insertion into meat or other items whose temperature is to be monitored. The body further comprises a window or other indication feature that allows discernment of movement of the indicators mounted with the wire or ribbon. For example, the body can comprise a window that is over the first indicator when the wire or ribbon is in its longest state. Contraction of the wire or ribbon can bring the second indicator into view in the window. Giving the indicators contrasting colors can allow for easy human discrimination between indicators. Changes in temperature will not cause a change in indicator as long as the thickened portion is attached since movement of the wire or ribbon, and hence movement of the indicators, is constrained. Removal of the thickened portion allows the wire or ribbon to contract when the temperature exceeds a critical value, moving the indicators so that a different indicator is now discernible. The movement constraint provided by the thickened portion can also be provided, for example, by a bend in the wire or ribbon, or an additional element added to the wire or ribbon such as a pin attached to the wire or ribbon.

The present invention can sense a wide range of temperatures when made with appropriate SMAs. Those skilled in the art know of many suitable SMAs, including Ag—Cd, Au—Cd, Cu—Al—Ni, Cu—Sn, In—Ti, Ni—Al, Ni—Ti, Fe—Mn—Si, Cu—Zn—A , Cu—Al—Ni, alloys thereof, and shape memory polymers such as polyurethanes. These materials typically possess Austenitic temperatures from −200° C. to 110° C. The addition of excess nickel, iron, chromium, and copper to the equiatomic alloy is common to adjust its physical properties (including its Austenitic finish temperature $A_f$).

EXAMPLE MANUFACTURING PROCESS

An example manufacturing procedure for a thaw/refrozen food sensor according to the present invention is briefly described here. This manufacturing method can be modified to accommodate other threshold temperature values and applications. The manufacturing procedure described provides for manufacture of the sensor at room temperature. The sensor can be inserted or mounted on a fresh food package before the package is frozen. The package can then be frozen, and the sensor used to indicate if the food package has ever been thawed, even if subsequently refrozen.

Figure 4A:
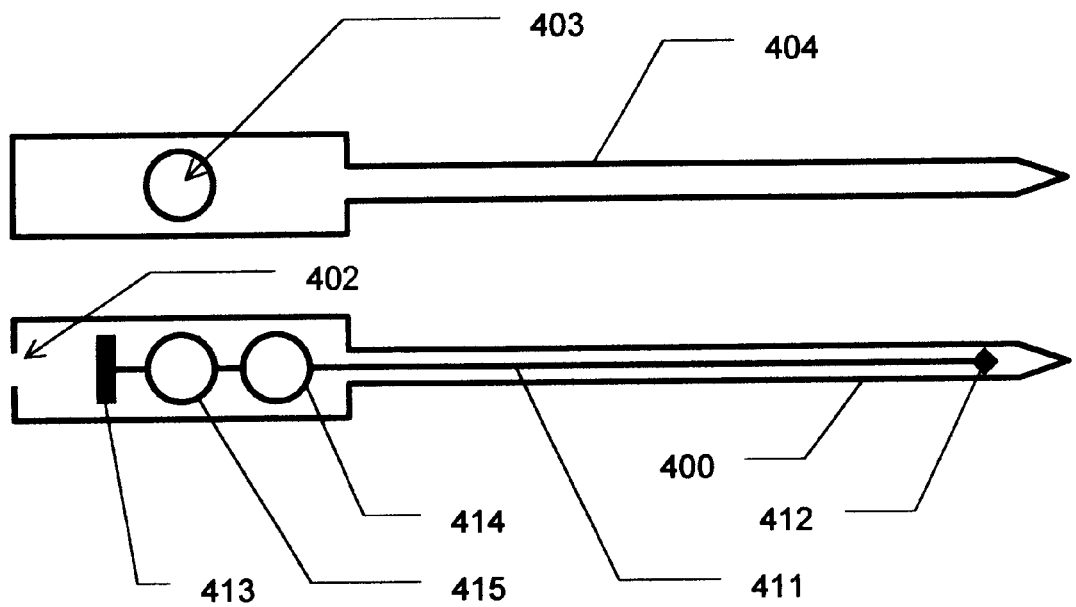
FIG. 4(a,b,c,d) is an illustration of an apparatus according to the present invention.
Figure 4B:
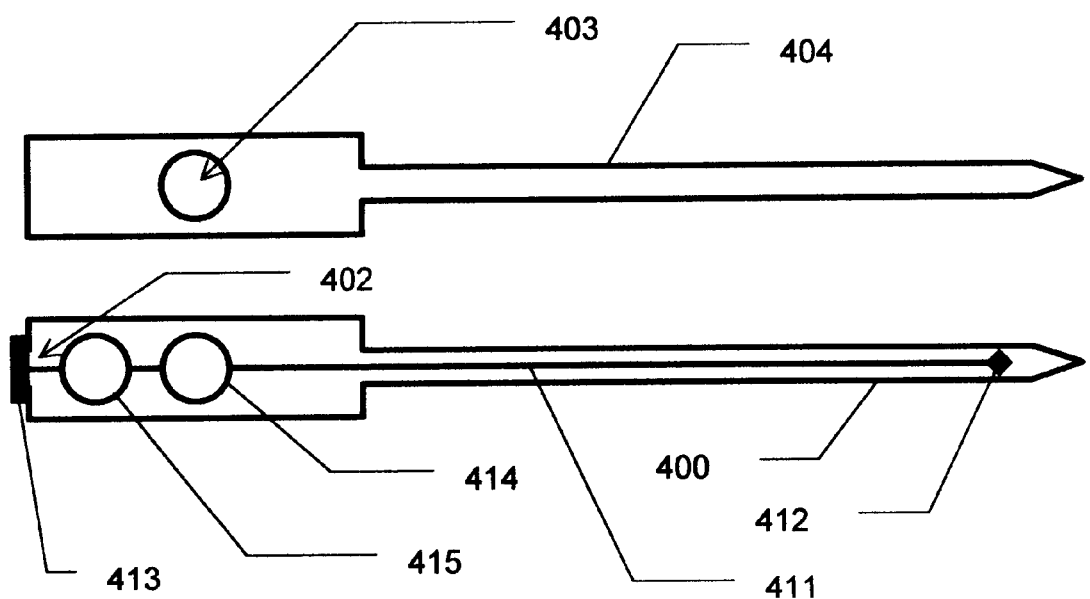

As shown in FIG. 4a, manufacture can start in room temperature by placing an SMA wire assembly 411 in the sensor shell 400 with one end secured to a pin 412. In this situation the SMA portion 411 is at room temperature which can be well above a threshold Austenitic finish temperature $A_f$ of, for example, 1° C. (Celsius). Such an Austenitic temperature is slightly above a freezing temperature of 0° C. The SMA at room temperature is in a contracted state and is shorter than the total length of the shell 400. Shell lengths between 5 cm and 15 cm can be suitable. The SMA wire (diameters of 250–500 microns can be used) is in a superelastic state (Martensitic state):contracted and behaving like a rubber band. Thus, the red indicator 415 will be lined up with an indicator window 403. At this stage of manufacturing the engagement knob 413 is grabbed and the wire 411 is stretched (superelastic) to reach the holding slot or portion 402 and the knob is placed securely in the notch or slot of holding portion or groove 402 as shown in FIG. 4b. The green indicator 414 now will be lined up with the indicator window 403 and the SMA wire will be in a stretched state. The cap 404 containing the indicator window 403 is now placed or firmly snapped on top of the sensor shell 400 and the sensor is ready to be used in a fresh unfrozen body of food package.

Figure 4C:
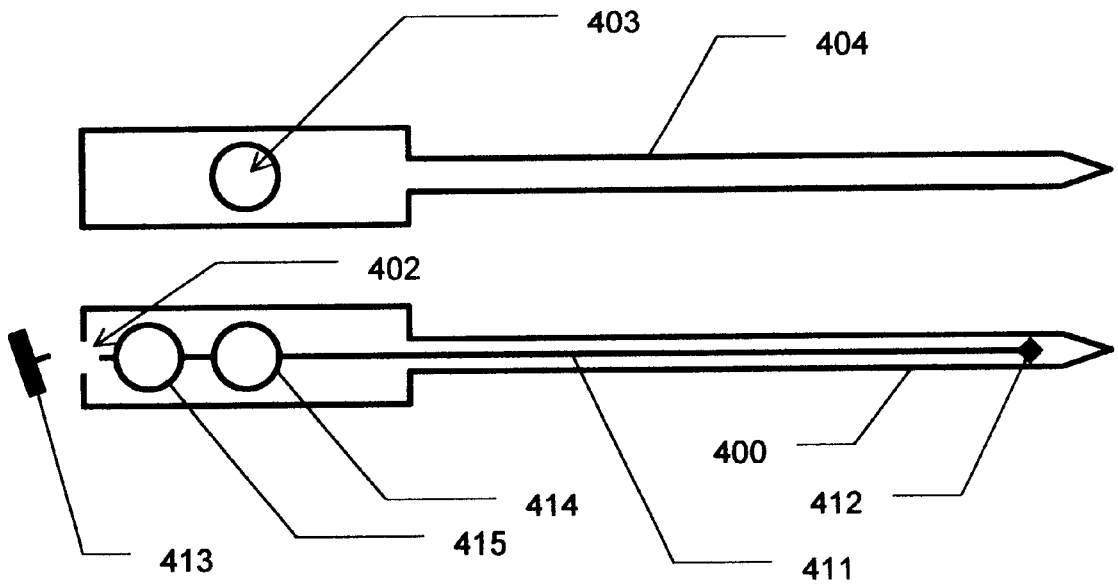
Figure 4D:
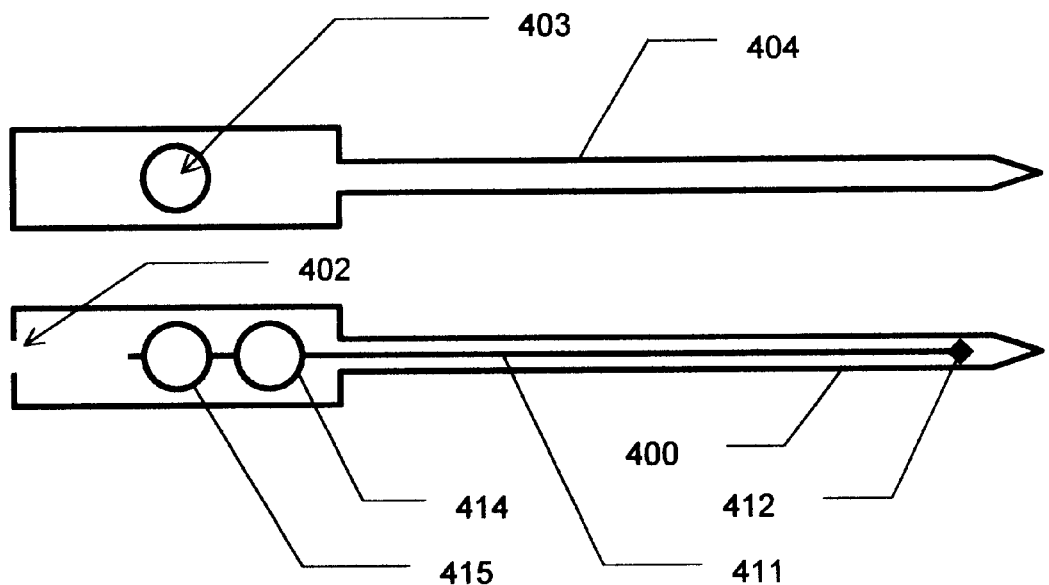

The sensor can now be inserted into the body of foodstuff, for example chicken, sausage or turkey, to be frozen. As an example, limiting the body cross-sectional area to less than 27 mm² can accommodate insertion into foodstuffs, for example a 2 mm diameter needle shape can be suitable. The food package with the sensor inserted in it can be put in a freezer to be frozen below 0 degrees Celsius. Thus, the SMA wire becomes Austenitic and softens, losing its tension. The indicator window 403 still shows a green indicator 414 as shown in FIG. 4b. Having been frozen the food package can now be inspected at an inspection station before shipping or placement in cold storage compartments and the inspector can break-off or remove the engagement knob 413 before the frozen food package is placed in a freezer for storing or shipping purposes. Upon breakage or removal of the engagement knob 413, as long as the temperature remains below the Austenitic temperature, the SMA wire will not contract and the green indicator 414 will show through the indicator window 403 as shown in FIG. 4c. If the food package ever experiences temperature above the Austenitic temperature, (for example, temperatures that would cause dangerous thawing of the foodstuff), the SMA element 411 will contract and the green 414 indicator will move to display the red indicator 415 through the indicator window 403 as shown in FIG. 4d. The indicator will not change to green, even if the sensor is refrozen, because the SMA wire does not lengthen to original length without an applied resilient force such as a linear spring.

The particular sizes and equipment discussed above are cited merely to illustrate particular embodiments of the invention. It is contemplated that the use of the invention may involve components having different sizes and characteristics. It is intended that the scope of.the invention be defined by the claims appended hereto.

I claim:
1. A temperature history indication apparatus, comprising:
a) a body, defining a path from an attachment portion thereof to an engagement portion thereof;
b) a sensing element, having a first portion mounted with the attachment portion such that motion of the first portion toward the engagement portion along the path is constrained, and having a second portion capable of first and second configurations, mounted with the engagement portion such that movement of the second portion toward the attachment portion along the path is prevented by such mounting when in the first configuration and not prevented when in the second configuration, and having a temperature responsive element made of a shape memory alloy mounted with the first and second portions such that changes in the temperature responsive element urge motion of the second portion toward the attachment portion along the path.

2. The apparatus of claim 1, wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn—Al, Cu—Al—Ni, alloys thereof, shape memory polymers, polyester prepolymers, and polyurethane.

3. The apparatus of claim 1, wherein the body has a length greater than 5 cm and less than 15 cm, and wherein the body comprises a first section having a cross-sectional area of less than 27 mm² and a second section wherein temperature-responsive changes in the shape of the shape memory allow are observable.

4. The apparatus of claim 3, wherein the cross-sectional area of the first section changes with distance from the second section, and wherein the cross-sectional area of the first section is at a minimum at its greatest distance from the second section.

5. A temperature history indication apparatus, comprising:
a) a body, defining a path having a length from an attachment portion thereof to an engagement portion thereof;
b) a sensing element, mounted at a first end with the attachment portion fixed along the direction of the path, and having a removable mounting with the engagement portion fixed along the direction of the path, wherein the sensing element comprises a shape memory alloy that, when in its Austenitic state, provides the sensing element with an initial length sufficient to allow both mountings, and, when in its Martensitic state, provides the sensing element with length less than the initial length unless constrained by the removable mounting.

6. The apparatus of claim 5, wherein shape memory alloy is chosen from the group consisting of: Ag—Cd, Au—d, Cu—Al—Ni, Cu—Sn, In—Ti, Ni—Al, Ni—Ti, Fe—Mn—Si, Cu—Zn—Al, Cu—Al—Ni, alloys thereof, shape memory polymers, polyester prepolymers, and polyurethane.

7. A temperature history indication apparatus, comprising:
a) a body;
b) a shape memory alloy element having a first length in a first state and a second length in a second state;
c) means for mounting the shape memory alloy element with the body such that the shape memory alloy element is prevented from attaining its second length when the mounting is in a first configuration but not when the mounting is in a second configuration;
d) means for making change in the length of the shape memory alloy element perceptible.

8. The apparatus of claim 7, wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn—Al, Cu—Al—Ni, alloys thereof, shape memory polymers, polyester prepolymers, and polyurethane.

9. A temperature history indication apparatus, comprising:
a) a body;
b) a shape memory alloy element having first and second ends, mounted fixedly with the body at the first end, and mounted with the body at the second end in a removable fixed relationship, and having a length such that the shape memory alloy in its Austenitic state extends from the fixed mounting to the removeable fixed mounting sufficient to allow fixed mounting, and such the shape memory in its Martensitic state does not extend from the fixed mounting to the removeable fixed mounting sufficient to allow fixed mounting.

10. The apparatus of claim 9 wherein the shape memory alloy element comprises an indicator that assumes a first state when the apparatus is in condition a, where condition a is defined as either the removable fixed mounting is not removed or the shape memory alloy is in its Austenitic state; and assumes a second state when the apparatus is in condition b, where condition b is defined as the removable fixed mounting is removed and the shape memory alloy is in its Martensitic state.

11. The apparatus of claim 10 wherein the body comprises a window, and wherein the indicator comprises a region of the shape memory alloy whose appearance through the window when the apparatus is in condition a than its appearance through the window when the apparatus is in condition b.

12. The apparatus of claim 10, wherein the body comprises a signal region, and wherein the indicator obscures the signal region when the apparatus is in one of condition and condition b, and does not obscure the signal region when the apparatus is in the other condition.

13. The apparatus of claim 9 wherein the shape memory alloy element comprises a wire made of shape memory alloy, and wherein the body defines an opening sufficient to allow passage of the wire there through, and wherein the removable fixed mounting comprises a retainer too large to pass through the opening affixed to the wire.

14. The apparatus of claim 9 wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn—Al, Cu—Al—Ni, alloys thereof, shape memory polymers, polyester prepolymers, and polyurethane.

15. A temperature history indication apparatus, comprising:
a) a wire made of a shape memory alloy, having a first end and a second end, where the wire proximal the second end has a characteristic cross-section at a first distance from the second end, and an increased cross-section greater than the characteristic cross-section at a second distance, less than the first distance, from the second end;
b) a body, having tapering cross-section at a first body end, and having an opening prohibiting passage of wire of the increased cross-section and allowing passage of wire of the characteristic cross-section at a second body end;
c) an indicator mounted with the wire such that change in length of the wire causes perceptible change in the indicator;
d) wherein the wire mounts fixedly with the body at the first body end, and passes through the opening at the second body end.

16. The apparatus of claim 15, wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn—Al, Cu—Al—Ni alloys thereof, shape memory polymers, polyester prepolymers, and polyurethane.

17. The apparatus of claim 15, wherein the cross-sectional area of the body at the first body end is less than 27 mm$^2$, and wherein the indicator comprises a surface of at least 50 mm$^2$ whose visibility is changed responsive to changes in length of the wire.

18. A method of providing a persistent indication of a temperature history, comprising:
a) providing a shape memory alloy element, having a first length at temperatures below a threshold temperature, contracting to a second length when exposed to a temperature transition from below to above the threshold temperature, and not appreciably expanding when exposed to a temperature transition from above to below the threshold temperature, and whose length is physically constrained to be greater then the second length by a removable constraint;
b) exposing the element to temperatures below the threshold temperature;
c) removing the removable constraint;
d) exposing the element to unknown temperature history;
e) determining if the element exhibits the first length or the second length.

* * * * *